United States Patent [19]

Hoeprich

[11] Patent Number: 4,877,340
[45] Date of Patent: Oct. 31, 1989

[54] PROCESS FOR DERIVING THE CONTACT GEOMETRY FOR RACEWAYS AND ROLLERS OF A ROLLER BEARING

[75] Inventor: Michael R. Hoeprich, North Canton, Ohio

[73] Assignee: The Timken Company, Canton, Ohio

[21] Appl. No.: 207,542

[22] Filed: Jun. 16, 1988

[51] Int. Cl.[4] .................... F16C 33/36; F16C 33/58; F16C 43/04
[52] U.S. Cl. .......................... 384/571; 29/149.5 R; 384/565
[58] Field of Search ............... 384/445, 450, 548, 565, 384/568, 571; 29/149.5 R, 148.4 R, 148.4 A

[56] References Cited

U.S. PATENT DOCUMENTS

| | | |
|---|---|---|
| 1,794,580 | 3/1931 | Buckwalter . |
| 2,071,483 | 2/1937 | Hedgcock . |
| 3,527,513 | 9/1970 | Hewko . |
| 3,713,712 | 1/1973 | Derner et al. . |
| 3,951,483 | 4/1976 | Nakamura ..................... 384/571 X |
| 4,456,313 | 6/1984 | Hartnett et al. . |
| 4,523,862 | 6/1985 | Yasui et al. ..................... 384/571 X |
| 4,601,592 | 7/1986 | Jatczak et al. ................... 384/571 X |
| 4,696,581 | 9/1987 | Tsushima et al. .................. 384/565 |

FOREIGN PATENT DOCUMENTS 972035 11/1982 U.S.S.R. .

· OTHER PUBLICATIONS

Mather, J., *New Summation Technique Aids Roller Bearing Design*, Design Engineering, Mar. 1971, pp. 127–130.
Lundberg, G., *Elastic Contact Between Two Semi-Infinite Bodies*, 1939.
Johns, P. M. et al., *Roller Bearings Under Radial and Eccentric Loads*, Tribology International, Jun. 1981, pp. 131–136.
Batra, S. K. et al., *An Approximate Method for Evaluating Stresses Causes by an Arbitrary Pressure Distribution on the Surface of an Elastic Half Space*, pp. 144–156.
S.A.E. Technical Paper, 850764, by Hoeprich, Apr., 1985.

*Primary Examiner*—Thomas R. Hannon
*Attorney, Agent, or Firm*—Gravely, Lieder & Woodruff

[57] ABSTRACT

To derive suitable contact geometry, initial contact geometries are selected somewhat arbitrarily for the cup and cone raceways and for the roller side faces. Using the initial contact geometries, the internal bearing misalignments, that is the misalignment between the cup raceway and the rollers and the misalignment between the cone raceway and the rollers, are computed for each segment of the load cycle. From the internal misalignments so derived, modifications to the selected contact geometries are computed to create altered contact geometries which theoretically produce substantially uniform life along the lines of contact between the raceways and rollers. But these altered contact geometries produce different internal misalignments for the various segments of the load cycle, so new internal misalignments are calculated for the altered contact geometries. The new internal misalignments require further modifications to the raceways to effect uniform life along the lines of contact between the raceways and rollers, and this results in other altered contact geometries which in turn further changes the internal misalignments. The foregoing procedure of determining internal misalignments and modifying contact geometries is repeated over and over again until the iteration substantially coverges to a solution. The contact geometries that exist at convergence are ground into the actual bearing.

10 Claims, 5 Drawing Sheets

PROCESS FOR DERIVING THE CONTACT GEOMETRY FOR RACEWAYS AND ROLLERS OF A ROLLER BEARING

BACKGROUND OF THE INVENTION

This invention relates in general to roller bearings, and more particularly to a process for deriving contact geometry for the raceways and rollers of such bearings, with that geometry being weighted to account for the entire load cycle to which the bearing is subjected, to maintain the desired angular relationships between the raceways and rolling elements, and to maximize fatigue life.

The tapered roller bearing possesses the load carrying capacity of the cylindrical roller bearing while at the same time affording the capacity for adjustment and the accompanying precision that are characteristic of the angular contact ball bearing. In a simple single row tapered roller bearing, the cone (inner race) and cup (outer race) have tapered raceways, which are presented opposite to and face each other, and between the two raceways is a single row of tapered rollers, the frusto-conical side faces of which contact the raceways, thereby establishing lines of contact which converge toward a common region along the axis of rotation. The extended line contact enables the bearing to carry substantial loads, much like a cylindrical roller bearing, while the tapered geometry affords the capacity for adjustment. Like an angular contact ball bearing, this adjustment is achieved simply by shifting one race axially relative to the other. Indeed, a tapered roller bearing may be adjusted to a condition of preload where no axial or radial free motion exists between its cone and cup, and this renders the bearing suitable for use in precision machinery where an axis of rotation must remain perfectly stable with respect to some fixed reference.

The tapered rollers of course roll along the raceways of the cup and cone, and this rolling should occur without any sliding, that is to say, pure rolling contact should exist between the raceways and the rollers. This is achieved by constructing the raceways such that the two, if extended to their respective apexes, will have those apexes located generally at a common point along the axis of rotation for the bearing. The rollers, being in line contact with the raceways, will likewise, if extended to their respective apexes, have those apexes located at the very same point. A bearing so constructed is said to be "on taper" or "on apex".

Over the years the tapered roller bearing has undergone refinements, and as a result of such refinements it cannot be said that the raceways and rollers are "on taper" in the strictest sense of that expression. For one, it was discovered that where true on taper line contact exists with rollers having abrupt ends, high edge stresses occur at the ends of the line of contact. To eliminate the high edge stresses, the ends of the roller side faces or the raceways themselves are dubbed or rounded. Moreover, the raceways, or the roller side faces, and usually both, are "profiled", that is to say they are slightly crowned. This shifts more of the load to the midportions of the rollers and reduces the stress at the ends of the line of contact. According to one analytical procedure, a roller side face and body under load is divided into numerous elements, and for each element a diameter is calculated which will produce a stress that is essentially the same as the stress at the remaining elements. In other words, the calculations result in diameters which produce uniform stress along the lines of contact, and from these diameters one of course derives the profile. See U. S. Pat. 4,456,313.

A load placed on a machine component will cause that component to deflect, and where the component is supported on a tapered roller bearing, the deflection often distorts the bearing, creating a tilt or misalignment which concentrates the load at one end or the other of those rollers that are in the load zone, which is the sector of the bearing through which the load is transmitted. To compensate for misalignment, the raceway along which it manifests itself may be ground or otherwise configured off taper. Thus, when the load is applied, the raceway more closely approaches an on taper position, at least within the load zone. Since misalignment tends to concentrate the load at one end or the other of the row of rollers, a crown on the rollers or raceways will enable the bearing to better accommodate misalignment—and indeed this is a conventional procedure—but a high crown concentrates the stresses in a somewhat confined region between the ends of the rollers when no or less misalignment exists. This results in relatively high stresses over the reduced length of contact and thus decreases the fatigue life under lighter loads. See U.S. Pat. 1,794,580 and U.S. Pat. No. 3,951,4S3.

In another approach, which also requires dividing the roller into elements for purposes of analysis, the diameter for each element is designed to provide it and the portions of the raceways along which it rolls with a life that corresponds to the life at the remaining elements. In short, this procedure produces uniform life which could result in a profile different from that required for uniform stress. Indeed, stress is one of the factors considered in arriving at the uniform life profile along with misalignment. In any event, the resulting profile is symmetrical about its center. See SAE Paper 850764, M. R. Hoeprich, *Numerical Procedure for Designing Rolling Element Contact Geometry as a Function of Load Cycle*, April 1985. Of all the design procedures, only this one uses more than a single design load. Even so, the best composite geometry is not obtained because the resulting profiles are symmetrical and on taper.

Heretofore, the general practice has been to provide tapered roller bearings with symmetrical profiles along their raceways and rollers, but not to compensate for misalignment by adjusting the raceway angle. The absence of raceway angle compensation for misalignment resides in part, from a fear of having a bearing so compensated perform poorly at loads other than that for which it is compensated. If the lines of contact along raceways were truly linear, this reasoning might have some justification, but the raceways and rollers where they contact each other are convex, and this keeps the region of contact toward the middle of the races, even at relatively light loads.

The present invention resides in a process for deriving the contact geometry and profiles of the raceways and roller side faces as well as raceway angle modification in a tapered roller bearing for which the load cycle and relative misalignment of the inner and outer races are known. By properly weighting the operating loads and misalignments that a tapered roller bearing will experience, the process produces a contact geometry which extends the life of the bearing well beyond that which could be expected from traditional modifications to a true "on taper" design. The process also has utility in connection with cylindrical roller bearings.

DESCRIPTION OF THE DRAWINGS

In the accompanying drawings which form part of the specification and wherein like numerals and letters refer to like parts wherever they occur

DETAILED DESCRIPTION

Figure 1:
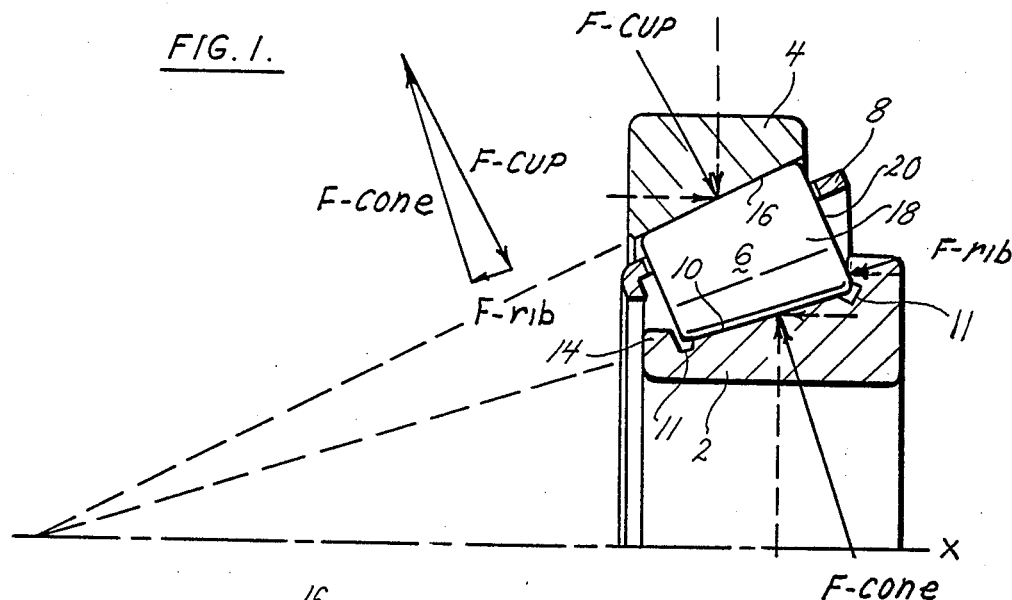
FIG. 1 is a sectional view of a tapered roller bearing and showing vectorially the forces which act on the bearing.

A typical tapered roller bearing A (FIG. 1) possessing one of the simplest configurations has three basic components through which loads, both radial and axial, are transferred, namely a cone 2, a cup 4, and a set of tapered rollers 6 arranged in a single row between the cone 2 and the cup 4. The rollers 6 enable the cone 2 to rotate relative to the cup 4, or vice-versa about an axis X of rotation, with relatively little frictional resistance, and when this rotation occurs, the rollers 6 move as a row relative to the cone 2 and cup 4, and indeed roll along the cone 2 and cup 4. One further component, a cage 8, maintains the proper spacing between the rollers 6 and further retains them around the cone 2 when the cone 2 is withdrawn from the cup 4.

The cone 2 has a tapered raceway 10 which is presented away from the axis X and two undercuts 11 between which the raceway 10 lies. In addition the cone 2 is provided with a thrust rib at the undercut 11 along the large end of the raceway 10 and a retaining rib 14 at the undercut 11 along the small end. Both ribs project outwardly beyond the raceway 10 and serve to axially confine the rollers 6, at least when the cone 2 is removed from the cup 4. The thrust rib further provides an abutment which prevents the rollers 6 from being expelled from the space between the cone 2 and cup 4 when a load is transmitted through the rollers 6. The cup 4 also has a tapered raceway 16, but the raceway 16 is presented inwardly toward the axis X and indeed encircles the cone raceway 10. Each tapered roller 6 has a tapered side face 18, sometimes referred to as a roller body, and also a slightly convex end face 20 at its large end. It is along their side faces 18 that the rollers 6 contact the cone 2 and cup 4, indeed the raceways 10 and 16 of the cone 2 and cup 4. The rollers 6 further contact the cone 2 along their end faces 20, bearing against the thrust rib 12 at this location.

The bearing is designed to carry radial loads, as well as axial or thrust loads, with the former usually being greater than the latter. Under the typical loading, the rollers 6, as they orbit between the cone and cup raceways 10 and 16, pass through a load zone. Each roller 6 as it moves through the center of this zone experiences its heaviest loads, and it is here that the forces and stresses on the cone 2, cup 4 and rollers 6 are generally analyzed, although all loads in the load zone could be considered. Irrespective of whether the loads are evaluated at the center of the load zone or throughout the load zone, the results of the analysis are essentially the same.

For purposes of analysis, the force or load transmitted from the cup 4 to the roller 6 at the center of the load zone may be considered as a single vector F-cup which is oriented perpendicular to the cup raceway 16 (FIG. 1). Similarly, the opposing force or load which is transmitted from the cone 2 to the roller 6 may likewise be represented as a vector F-cone which is perpendicular to the cone raceway 10. The vectors F-cup and F-cone resolve into radial and axial components. Since roller 6 itself is tapered, the force F-cup applied at the cup raceway 16 acts at a lesser angle with respect to the axis X than does the force F-cone exerted at the cone raceway 10. As a consequence, the axial component of the force F-cup exceeds the axial component of the force F-cone, and the roller 6 would be expelled from the space between the two raceways 10 and 16 were it not for a counteracting seating force applied at the thrust rib. The seating force, which is represented by the vector F-rib, likewise resolves into axial and radial components, with the former substantially exceeding the latter in magnitude.

As with any three-force system, the vectors F-cup, F-cone and F-rib may be combined or added vectorially to produce the traditional closed triangle (FIG. 1). That triangle represents a static condition, one in which a summation of the radial components for the three forces F-cup, F-cone and F-rib equals zero, with the same holding true for a summation of the axial components.

The traditional force diagram, while useful, represents a simplistic analysis which does not take into consideration many factors which in one way or another affect the life of the bearing A. One of these is stress, or force per unit area, along the two raceways 10 and 16 as well as along the tapered side face 16 of the roller 6. Obviously, neither force F-cup nor force F-cone in the actual bearing A is concentrated at a single point on the roller 6, but each instead represents a force that is spread along the full length of the roller 6, or at least most of the length of the roller 6. Each further represents a resultant of the stress over the area of contact. Thus, the forces F-cup and F-cone are perhaps better considered in terms of stress and of course stress is a factor which influences the life of the bearing A.

Another factor which affects the life of the bearing A is misalignment $\theta$ (FIG. 2) caused by deflection of the machine component which it carries, for any machine component, when loaded, will deflect. While the axis X of the cone 2 and cup 4 are in a simplistic and idealized analysis coincident, deflection can cause one to shift an angle $\theta$ relative to the other. This external misalignment causes the load to concentrate along the raceways 10 and 16, toward one end or the other of the rollers 6.

Any bearing can expect loads of varying magnitude, and still another factor which influences the life of a bearing is the length of time for which different loads and the misalignments which they produce exist. These loads are generally repeated in a cyclic manner. This cyclically repeated sequence of loads is referred to as the "load cycle". If, a bearing were designed solely with the heaviest loads and greatest misalignment in mind, but operated only a small proportion of time under those conditions, the raceways 10 and 16 or the rollers 6 or both would possess excessive crowns, if for no other reason than to accommodate the misalignment, but this excessive crown would concentrate more moderate loads in the middle of the raceways 10 and 16 and roller side faces 18, and this would result in a shortened life for the bearing A.

The bearing A operates under load cycle which is composed of several combinations of load, misalignment and durations for which the load and misalignment are applied. A load cycle is not to be confused with stres cycle. A stress cycle occurs for a point occurs on a raceway each time a roller 6 passes over end stresses the point while in the load zone. The fatigue damage per stress cycle is generally less for light loads than heavy loads. Normally, these light loads exist for a major portion of the time. Heavy loads will cause larger amounts of misalignment and the two combine to accumulate fatigue damage at disproportionately higher rates.

The fatigue life of a tapered roller bearing is a somewhat arbitrary factor, because the point at which a bearing fails is subject to varying interpretations. During operation, a bearing within its load zone is subjected to repeated stressing which eventually cause pitting and spalling along the contacting surfaces, that is along the cone and cup raceways 10 and 16 and along the roller side faces 18. According to the standards to which The Timken Company adheres, a bearing fails when the pitted or spalled area reaches 0.01 in$^2$, even though tests have shown that a bearing may be operated considerably beyond that point. The Timken Company defines the life or "rated life" of a bearing as the number of revolutions that 90% of a group of identical bearings will complete or exceed before reaching the foregoing failure criterion. This definition of bearing life applies to this discussion.

Figure 2:
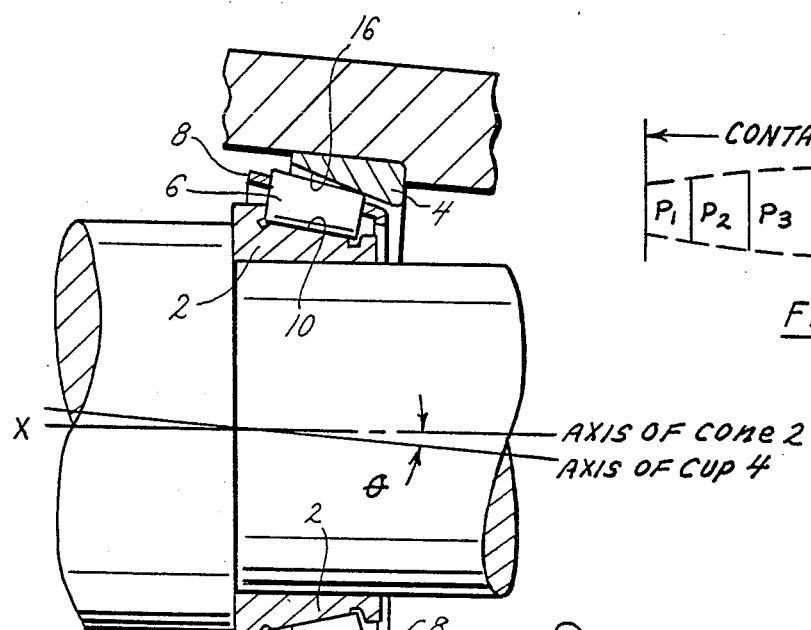
FIG. 2 is a sectional view of a bearing in which the cup and cone are misaligned, but the misalignment is exaggerated to more clearly observe it.

It can be generally said that the rollers 6, like the rollers of any tapered roller bearing, operate "on taper" or "on apex", meaning that the two raceways 10 and 16 if extended to their respective apexes would have those apexes located at a common point along the axis X of rotation, and likewise the rollers 6 if extended to their respective apexes would have those apexes at the same point (FIG. 1). Actually, the rollers 6 and raceways 10 and 16 deviate slightly from a truly on taper or on apex condition. In the first place, the two raceways 10 and 16 or the roller side faces 18 or all of them are slightly profiled, for otherwise the stresses which result from the transmission of the forces F-cup and F-cone would concentrate at the end edges of the rollers 6 and the portions of the raceways 10 and 16 in contact with those end edges due to the elastic properties of the metal from which the cone 2, cup 4 and rollers 6 are formed. Even if the profiles are disregarded, deflection of that which the bearing A supports will generally cause one of the raceways 10 or 16 to skew relative to the other, or in other words, the raceways 10 and 16 will go off axis by an angle $\theta$ by reason of this external misalignment (FIG. 2). Thus, the raceways 10 and 16 should be designed to a load cycle weighted "off taper" so that they more closely approach an "on taper" condition at the load zone when loads are applied. Properly profiling the raceways 10 and 16 or the roller side faces 18 further reduces stress concentrations imposed at the ends of rollers as a result of load and remaining misalignment.

The present invention provides the cone and cup raceways 10 and 16 and the roller side faces 18 with profiles and taper adjustments which extend the life of the bearing A well beyond that which could be obtained from a true on taper design and even an on taper design modified in the traditional manner to compensate for edge loading and misalignment.

To derive the proper profiles for the raceways 10 and 16 and the roller side faces 18, an initial profile for each is initially selected arbitrarily. In this initial profile, the raceways 10 and 16 and the roller side faces 18 may be slightly crowned as desired. The cyclically repeated loading conditions for the bearing A are also determined, or in other words, a load cycle is established. The load cycle consists of several segments and for each segment the following information must exist:

1. roller load
2. external bearing misalignment
3. portion of total operating time for which the segment exists Other factors which affect fatigue life, such as the effects of chemicals and surface finish, could be included in deriving the load cycle, but they have relatively little influence on the profiles which are derived and accordingly are ignored.

For bearing A (FIG. 1), the roller load constitutes the force exerted at the cup 4 on that roller 6 of the bearing which is centered in the load zone, or in other words constitutes the force F-cup which acts normal to the cup raceway 16. It may be referred to as the cup-roller load or cup-raceway load and is expressed in units of force, such as pounds. The bearing misalignment $\theta$, which is sometimes referred to as external misalignment, represents the misalignment between the cone and cup raceways 10 and 16 resulting from deflection of the machine components between which the bearing A is located (FIG. 2). This is peculiar to the machine in which the bearing A is located and generally increases with an increase in roller load. In other words, the bearing misalignment $\theta$ depends on the extent to which the machine component over which the cone 2 fits deflects relative to the machine component into which the cup 4 is fitted or vice-versa when either one is loaded, which in turn depends on the stiffness of the components and the bearing A. The bearing misalignment $\theta$ is usually expressed as inches off taper per inch of length (in/in), but may also be expressed as an angle. The portion of the load cycle for which a segment exists, that is the duration of the segment, is expressed as a percentage, and of course the total of the several segments should be 100 percent. The roller load F-cup and misalignment $\theta$ are calculated from formulas which are well known to bearing and machine designers.

The cup-roller force F-cup, which is known for each segment of the load cycle, will exceed the cone-roller force F-cone, owing to the angular relationship between the forces F-cup, F-cone and F-rib, but the difference is usually not very much. Even so the cone-roller force F-cone for each load cycle segment is likewise calculated and this is a relatively simple computation which can be derived from the force triangle (FIG. 1). The cone-roller force F-cone, like the cup-roller force F-cup, is expressed in units of force, such as pounds. It constitutes the load along the cone raceway 10 and may be referred to as the cone raceway force. When the bearing A operates at high angular velocities, inertial forces and moments, such as those experienced by the rollers 6, are also calculated to determine F-cone, F-cup and F-rib.

Once the roller loads F-cone, F-cup and F-rib, the misalignment $\theta$, and duration for each segment of the load cycle are calculated, the misalignment $\theta$ for each segment is further analyzed to determine how much of it exists between the cone 2 and the roller 6 and how much of it exists between the roller 6 and the cup 4. This is sometimes referred to as internal misalignment. Again the internal misalignment is expressed in terms of inches off taper per inch of length. For each load cycle segment the cone-roller misalignment together with the cup-roller misalignment will equal the total misalignment $\theta$.

The procedure for ascertaining the internal misalignment between the roller 6 and the cone 2 and likewise between the roller 6 and the cup 4 basically resolves into a search for the equilibrium position assumed by the roller 6 when subjected to the three resultant forces F-cup, F-cone and F-rib and any inertial loads caused by high speed operation. Of course, this analysis generally concerns only one roller 6, that being the roller 6 that is within the center of the load zone. The internal misalignment can be found by determining that angular position of the roller 6 which produces stress distributions that resolve into forces F-cup, F-cone and F-rib which cancel out all moments on the roller 6, that is, result in a net zero moment on the roller 6. The internal misalignment between the cup 4 and the roller 6 together with the internal misalignment between the cone 4 and the roller 6 equal the external misalignment $\theta$. The procedure is accomplished through iteration, with an assumed initial roller position, that is internal misalignment, used for the inital calculation.

For each position of the roller 6 in the iteration the resultant forces F-cup, F-cone and F-rib are derived through a contact stress analysis of the type described in SAE Paper 850764 of Michael R. Hoeprich entitled *Numerical Procedure for Designing Rolling Element Contact Geometry as a Function of Load Cycle*. This procedure involves dividing the roller side face 18 into segments and analyzing each segment. Once the stress distributions are ascertained, the locations of the resultant forces F-cup, F-cone and F-rib are easily determined. Should the calculations for any assumed position of the roller 6 show an imbalance of the moments on the roller 6, another series of calculations is conducted with the roller 6 rotated slightly to alleviate this imbalance, but this of course changes the locations at which the resultant forces F-cup, F-cone, and F-rib act; hence the iteration. In any event, the iteration proceeds to a convergence, that is to a roller position in which the sum of the moments acting on the roller 6 is zero or essentially zero. It is at this position that the internal misalignments are taken.

At this point in the analysis for each segment of the load cycle, the loads or forces F-cone and F-cup at the raceways 10 and 16 are known, as are the internal misalignments between roller 6 and the raceways 10 and 16. The duration of the load cycle segment is likewise known. With this information available, it is possible to determine where the arbitrary profiles and tapers selected for the raceways 10 and 16 and the roller side faces 18 should be altered and by how much to obtain maximum life. This may require theoretically adding material to one of the raceways 10 or 16 and the roller side face 18 at one location and theoretically removing at another to alter the contact geometries of such surfaces.

Contact geometry refers to both the profile and taper of a surface such as the cone raceway 10, cup raceway 16, or side face 18 of the roller 6. The alteration to the contact geometries for raceways 10 and 16 and side faces 18 must reflect the extent to which different load cycle segments stress different portions of the raceways 10 and 16 and side faces 18. The procedure for maximizing bearing fatigue life through improved contact geometries for raceways 10 and 16 and side faces 18 can be obtained by combining the algorithm in SAE Paper 850764 with the analysis previously described for determining internal bearing misalignment.

The procedure basically involves dividing the roller along its line of contact into elements, with the elements being progressively smaller toward the ends of the line of contact, and computing the load cycle life for each element. Initially the elements will show different load cycle lives. For any element having a relatively short life, metal is theoretically removed at that element, whereas for any element having relatively long life, metal is added, with the amount of metal removed at each element being in direct proportion to the difference in life between that element and the average life for all of the elements. The object of the calculations is to have uniform load cycle life along the line of contact between the roller side face 18 and the raceway 10 or 16, whichever is under consideration for the particular internal misalignments and loads previously computed.

Figure 3:
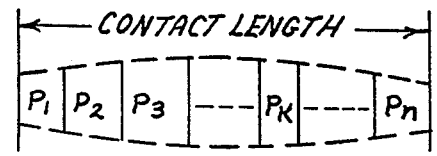
FIG. 3 is a schematic view showing the area of contact between a roller and a raceway divided into elements for purposes of conducting a stress analysis.

More specifically, the analysis by which a uniform life contact geometry is derived begins with a stress analysis wherein the stress at each element along the line of contact is determined. To solve the contact stress problem, the contact length between the roller side face 18 and raceway 10 or 16 under consideration is first divided into "n" number of elements (FIG. 3). Element lengths are increased towards the middle of the contact to minimize the number of elements and yet retain adequate resolution where needed. The pressure distribution on each element is assumed to be semi-elliptical across the contact width and of constant value along the element length. The basis of solution is that in the region of contact, the total deflection of the two bodies at a point must equal the approach of the two bodies minus the initial separation. The total elastic deflection at any element position (ie. kth element) is determined by applying the method of superposition and summing the deflections occurring at the kth element due to the n element pressures $P_i$ (FIG. 3). The resulting equations to be solved follow:

$$W - C_k = W_k \quad (1)$$

$$\text{where } W_k = \sum_{i=1}^{n} P_i K_{ki} \quad (2)$$

$$P_k \geqq 0 \text{ for all } k \quad (3)$$

$$\text{total roller load} = \sum_{k=1}^{n} .5\pi P_k l_k b_k \quad (4)$$

The symbols used in the foregoing equations as well as other equations are defined in the table appearing at the end of this specification.

Equations (1), (2) and (3) are used to generate a set of n simultaneous non-linear equations which are used to solve for $P_k$ for each estimate of W. Equation (4) is used to iterate and determine the value of W.

Figure 4:
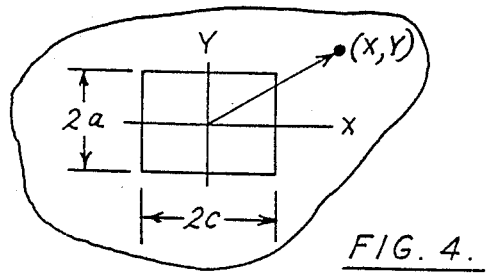
FIG. 4 shows a rectangular area of uniform pressure for visualizing deflection at a particular point.

The semi-elliptical pressure distributions are approximated with rectangular areas of uniform pressure (FIG. 4). If Wa in equation 5 is the deflection at a point due to uniform pressure over a rectangular area, then the values of $K_{ki}$ can be determined from equation 5.

$$W_a = \frac{P(1 - z^2)}{\pi E} D \quad (5)$$

Where $$D = (x + c) \ln \left[ \frac{(y + a) + \sqrt{(y + a)^2 + (x + c)^2}}{(y - a) + \sqrt{(y - a)^2 + (x + c)^2}} \right] +$$

$$(y + a) \ln \left[ \frac{(x + c) + \sqrt{(y + a)^2 + (x + c)^2}}{(x - c) + \sqrt{(y + a)^2 + (x - c)^2}} \right] +$$

$$(x - c) \ln \left[ \frac{(y - a) + \sqrt{(y - a)^2 + (x - c)^2}}{(y + a) + \sqrt{(y + a)^2 + (x - c)^2}} \right] +$$

$$(y - a) \ln \left[ \frac{(x - c) + \sqrt{(y - a)^2 + (x - c)^2}}{(x + c) + \sqrt{(y - a)^2 + (x + c)^2}} \right]$$

Before determining $K_{ki}$, $b_i$ must be determined since $K_{ki}$ is a function of $b_i$. This is done by using the local curvatures at each element position i in directions both circumferential and along the contact length to determine the relationship between contact width ($2b_i$) and peak contact pressure ($P_i$) from the classical concentrated contact solutions. Then n influence coefficients $K_{ki}$ are determined for each of the n semi-elliptical pressure distributions using Equation (5).

After the stress at each increment is calculated, the fatigue life at each element is calculated using the Miner's rule, namely $$L_k \alpha \left[ \sum_{j=1}^{m} \frac{t_j}{P_j^c f_j} \right]^{-1} \quad (6)$$

Figure 5:
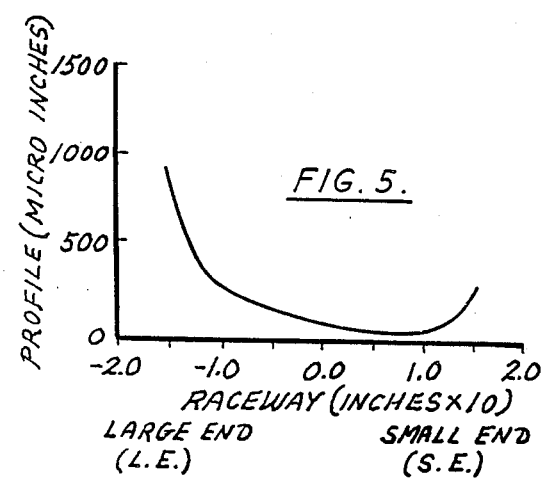
FIG. 5 illustrates a contact geometry as a composite of a profile superimposed on a slope.

Not all elements will show the same fatigue life. To more closely approach uniform fatigue life, metal is added or removed from the profiles at the roller-cup contact and at the roller-cone contact, at least from a theoretical standpoint. Indeed, along the profile at each contact, metal is added or removed from a profile at each element in direct proportion to the magnitude and sign of the cycle life of the element relative to the average fatigue life for all of the elements. The alterations of the profiles also affect the taper, and thus are perhaps more appropriately described as an alteration of contact geometry, since they change not only the profiles but the taper as well. Profile considered along with taper, it will be recalled, constitute the contact geometry. In any event, the resulting contact geometry may be described numerically as coordinates on a Cartesian coordinate system or it may be described numerically as the composite of a profile superimposed on a slope, with the slope representing the taper (FIG. 5). In the composite, the line representing the slope lies tangent to the middle of the line representing the profile. The profile which is derived from the process when compared to the symmetrical profile, without taper adjustment, derived from the process set forth in SAE Paper 850764, has less curvature and results in lower stresses.

The adjustment to taper may be subtracted from the contact geometry of the raceway 16 and applied to the raceway 10 or vice-versa.

As to the roller-cup contact, theoretical addition or removal of metal, that is the alteration of the contact geometry, is usually made along the cup raceway 16 and not the roller side face 18, since an alteration at this location does not affect roller-cone contact. Likewise an alteration of contact geometry along the roller-cone contact usually occurs on the cone raceway 10 and not the roller side face 18. As a result of the uniform life calculations, the raceways 10 and 16 acquire altered contact geometries, and this in turn changes the internal misalignment between the cone 2 and the roller 6 and also between cup 4 and roller 6. Using the foregoing procedure with the altered contact geometries, the two internal misalignments are again calculated for each segment of the load cycle. With these new internal misalignments, new contact geometries are derived for the cone and cup raceways 10 and 16. These new contact geometries produce still different internal misalignments between the cone 2 and roller 6 and between the cup 4 and roller 6, and they in turn result in still different contact geometries. Indeed, the procedure resolves into an iteration by which the foregoing steps are repeated over and over again. Digital computers render this possible.

With each set of contact geometries in the iteration the internal misalignment changes less, and so does the alteration of the contact geometries at the cup-roller contact and cone-roller contact, and eventually a point is reached where furtherance of the iteration produces no significant changes in internal misalignments or contact geometry. At this point the procedure is said to have converged to a solution and no continuation of the iteration is necessary. The bearing A is then ground to provide its raceways 10 and 16 and its roller side faces 18 with the profiles so derived.

A slight deviation from the uniform life criteria may be incorporated into the profiles for the raceways 10 and 16 and the roller side face 18 at the ends of the lines of contact to further reduce subsurface shear stresses. See SAE Paper 850764.

In lieu of the numerically derived profile previously described, it is possible to use a single radius as the profile of the cone raceway 10 or the cup raceway 16, more commonly the latter. This procedure retains the taper adjustment determined in the numerical analysis. The forces F-cup, F-cone and F-rib and the calculated internal misalignment for the raceway 10 or 16 under consideration provide a basis for selecting a profile radius having optimum load cycle life. In this procedure, the stresses along each raceway 10 and 12 and the resulting life $L_s$ cycle condition are determined for each load as previously described. A relative cycle life $L_c$ for the raceway 10 or 16 is determined by comparing different profile radii using the following formulas:

$$\text{Life of load cycle segment, } L_s \alpha \left[ \sum_{i=1}^{n} \left( \frac{P_i b_i}{l_i} \right)^{db} l_i \right]^{-\frac{1}{b}} \quad (7)$$

$$\text{Load cycle life, } L_c \alpha \left( \sum_{s=1}^{m} \frac{t_s}{L_s} \right)^{-1} \quad (8)$$

Using a profile radius is not as effective as a numerically derived profile, but the benefits of load cycle based taper adjustment are for the most part retained.

A typical bearing A would have a profile radius on the raceway 16 for its cup 4, another profile radius on the side faces 18 of its rollers 6, and a numerically derived profile for the raceway 10 of its cone 2. To simplify manufacture all of the taper adjustment determined for both the cone and cup contact geometries is applied to the cup raceway 16 during each step in the iteration. The following example pertains to a bearing of the foregoing configuration.

EXAMPLE

A tapered roller bearing A operates under a load cycle consisting of three segments or conditions 1, 2 and 3 which possess the following characteristics:

| Load Cycle Condition | Cup-Roller Load F-cup | Cone-Cup (External) Misalignment Θ | Duration |
|---|---|---|---|
| 1 | 1000 lbs. | .004 in/in | 3% |
| 2 | 750 lbs. | .0025 in/in | 7% |
| 3 | 500 lbs. | 0 | 90% |

Figure 6:
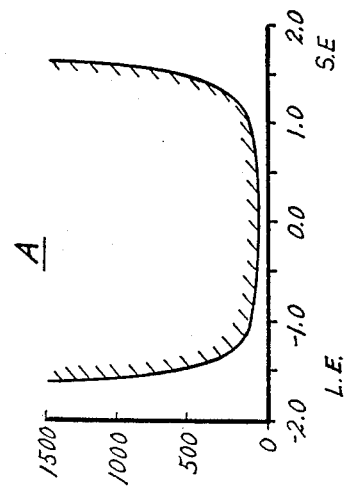
FIGS. 6A–F illustrate contact geometries for several regions of contact (raceways and rollers), both preliminary and final.
Figure 6:
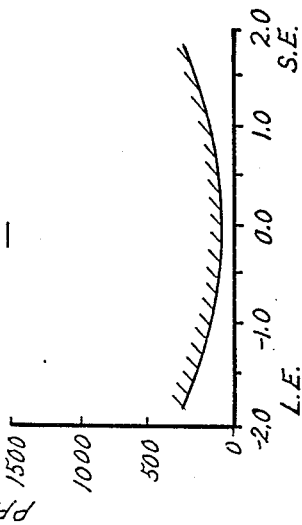
Figure 6:
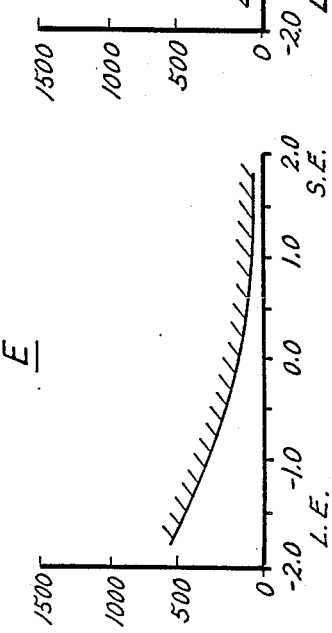
Figure 6:
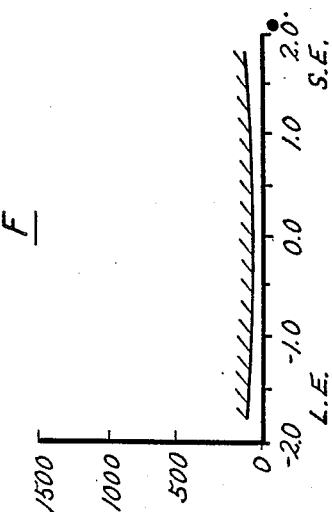

To start the analysis, reasonable initial profiles for cone and cup raceways 10 and 16 are assumed as shown in FIGS. 6A and D. The initial assumed profile for the cone raceway 16 is composed of several tangent radii in this case, although the procedure could also start with a simple crown radius. The closer the first guess is to the final shape, the fewer steps in the iteration. The initial profile for the cup raceway 16 is a simple crown radius. The profile for the roller side face 18 is also a simple crown radius which retains a fixed value throughout the design procedure and is shown in FIG. 6F. Although the roller profile shown is fairly flat, this need not be since it is the composite contact geometry of roller side face 18 and raceways 10 and 16 which is important. The degree of profiling between the roller side face 18 and the raceway 10 and 16 may be traded back and forth as long as the net separation between the bodies along the raceways 10 and 16 conforms to that determined by the process of the present invention.

Step I (initial calculation)

A. Using the foregoing information, the internal misalignment within the bearing is calculated along with the cone-roller load.

| Load Cycle Condition | Cone-Roller Contact Load F-cone | Cone-Roller Contact Misalignment | Cup-Roller Contact Load F-cup | Cup-Roller Contact Misalignment |
|---|---|---|---|---|
| 1 | 999.1 lbs. | .00304 in/in | 1000 | .00096 in/in |
| 2 | 749.3 lbs. | .00197 in/in | 750 | .00053 in/in |
| 3 | 499.5 lbs. | .00021 in/in | 500 | −.00021 in/in |

Positive misalignment values indicate the load is shifted toward the large end of the roller.

B. Using the above cone-roller loads misalignments, the cone raceway streses for the three load cycle conditions are calculated. The uniform life criteria is now used to determine the desired profile for the cone raceway 10. The resulting cone profile had a load cycle weighted taper adjustment of −0.001130 in/in which would reduce stresses at the cone raceway large end. Since, in this bearing design, all of the taper adjustment is to be on the cup raceway, only the numerically calculated profile with the taper adjustment subtracted is retained for the cone raceway. The −0.001130 in/in cone raceway taper adjustment is applied to the cup-roller contact by increasing the cup raceway angle by 0.001130 in/in.

C. The crown for the cup raceway 16 is now determined using equations 7 and 8 with the cup-roller misalignment from Step I A. A radius of 60 inches combined with the taper adjustment results.

Using these new raceway geometries, the procedure is repeated. Raceway loads will not change; however, pressure distributions and internal misalignments will.

Step II (first step of iteration)

A. Using the new cone and cup raceway geometries, internal bearing misalignments are recalculated.

| Load Cycle Condition | Cone-Roller Misalignment | Cup-Roller Misalignment |
|---|---|---|
| 1 | .00217 in/in | .00183 in/in |
| 2 | .00117 in/in | .00133 in/in |
| 3 | −.00053 in/in | .00053 in/in |

B. The numerical cone profile resulting from data in Step II A had a profile adjustment of −0.000355 in/in which was used in Step II C below in addition to the previous taper adjustment of −0.001130 in/in.

C. The new re-evaluated cup crown is 75 inches with a taper compensation of +0.001485 in/in.

Step III (second step of iteration)

A. Using Step II race geometries and cup race taper adjustment.

| Load Cycle Condition | Cone-Roller Misalignment | Cup-Roller Misalignment |
|---|---|---|
| 1 | .00194 in/in | .00206 in/in |
| 2 | .00093 in/in | .00157 in/in |
| 3 | −.00080 in/in | .00080 in/in |

B. The numerical cone profile resulting from data in Step III A is shown in FIG. 6B. The slope at the center is −0.000095 in/in which is sufficiently small to say the procedure has converged to a solution. This profile may then be slightly modified per manufacturing considerations, thus resulting in the profile shown in FIG. 6C.

C. The final cup profile is a 90 in radius with a taper compensation of +0.00158 in/in. This is shown in FIG. 6E.

| NOMENCLATURE | |
|---|---|
| a | half length of area for integration |
| $b_i, b_k$ | half width of contact |
| b | load life exponent |
| c | half width of area for integration |
| $C_k$ | initial clearance between roller and raceway at element k before loading |
| d | Weibull life dispersion factor |
| E | modulus of elasticity |
| $f_j$ | environmental life adjustment factor |
| $K_{ki}$ | influence coefficient to determine the deflection of two bodies at element k due to the pressure on element i |
| $l_i, l_k$ | axial length of element |
| L | cycle life |
| $L_k$ | load cycle life of element k |

-continued

| NOMENCLATURE | |
|---|---|
| m | number of conditions in load cycle |
| n | number of elements |
| P | pressure |
| $P_i, P_k$ | maximum compressive stress over length of element |
| $P_{kj}$ | maximum compressive stress over length of element k for load cycle condition j |
| s | stress-life exponent |
| $t_j, t_s$ | fraction of time for load cycle condition j,s |
| W | relative approach of distant points in the roller and raceway |
| $W_k$ | total elastic deflection of surfaces at element k for both roller and raceway |
| $W_a$ | elastic deflection due to area of uniform pressure |
| x,y,z, | coordinates |
| θ | bearing misalignment (+ load shifted to large end) (− load shifted to small end) |
| $\approx$ | Poisson's ratio |

The invention is a also useful for deriving the profiles of raceways on tapered roller thrust bearings.

This invention is intended to cover all changes and modifications of the example of the invention herein chosen for purposes of the disclosure which do not constitute departures from the spirit and scope of the invention.

What is claimed is:

1. In connection with a tapered roller bearing including at least one cone having an outwardly presented raceway, at least one cup having an inwardly presented raceway, and tapered rollers located between the cone and cup and having side faces which contact the cone and cup raceways, whereby for each roller a first contact exists between the cup raceway and the roller side face and a second contact exists between the cone raceway and the roller side face, a process for deriving the contact geometries for the raceways and roller side faces from a plurality of known load cycle repetitions, each load cycle repetition having a plurality of segments including load, external misalignment, and duration, said process comprising: arbitrarily selecting initial contact geometries for the raceways and roller side faces; for the selected contact geometries computing the internal misalignment between the cup raceway and the rollers and between the cone raceway and the rollers for each segment of the load cycle; using the internal misalignments, computing modifications to the selected contact geometries to provide altered contact geometries in which substantially uniform life theoretically exists along the first contact and also along the second contact; computing the internal bearing misalignments for the altered contact geometries for each segment of the load cycle; computing further modifications to the altered contact geometries to provide further altered contact geometries in which substantially uniform life theoretically exists along the first and second contacts at the recomputed internal misalignments; and reiterating the foregoing steps of computing internal misalignments and computing geometry modifications and altered contact geometries until substantial convergence is achieved, the resulting contact geometries having tapers which are off taper.

2. The process according to claim 1 wherein the profile arbitrarily selected for the rollers includes a crown.

3. The process according to claim 1 wherein the modifications to the contact geometries throughout the iteration are made along the cone and cup raceways.

4. The bearing produced in accordance with the process set forth in claim 1.

5. In connection with a roller bearing including an inner race having an outwardly presented raceway, an outer race having an inwardly presented raceway, and rollers located between the two races and having side faces which contact the raceways, whereby for each roller a first region of contact exists between the raceway for the inner race and the roller side face and a second region of contact exists between the raceway for the outer race and the roller side face, a process for deriving the contact geometries for the raceways and roller side faces from a known load cycle having a plurality of segments, said process comprising: arbitrarily selecting initial contact geometries for the raceways and roller side faces; for the selected contact geometries computing the internal misalignment between the raceway of the outer race and the rollers and between the raceway of the inner race and the rollers for each segment of the load cycle; using the internal misalignments, computing modifications to the selected contact geometries to provide altered contact geometries in which substantially uniform life theoretically exists along the first regions of contact and also along the second regions of contact; computing the internal bearing misalignments for the altered contact geometries for each segment of the load cycle; computing further modifications to the altered contact geometries to provide further altered contact geometries in which substantially uniform life theoretically exists along the first and second regions of contact at the recomputed internal misalignments; and reiterating the foregoing steps of computing internal misalignments and computing geometry modifications and altered contact geometries until substantial convergence is achieved.

6. The process according to claim 5 wherein the contact geometries resulting from the convergence have tapers which are off taper.

7. The bearing produced in accordance with the process set forth in claim 5.

8. In connection with a roller bearing including a first race having a first raceway and a second race having a second raceway presented opposite the first raceway of the first race, and rollers located between the races and having side faces which contact the raceways, whereby for each roller a first contact exists between the first raceway and the roller side face and a second contact exists between the second raceway and the roller side face, a process for deriving the contact geometries for the raceways and roller side faces from a plurality of known load cycle repetitions, each having a plurality of segments including load, external misalignment, and duration, said process comprising: arbitrarily selecting initial contact geometries for the raceways and roller side faces; for the selected contact geometries computing the internal misalignment between the first raceway and the rollers and between the second raceway and the rollers for each segment of the load cycle; using the internal misalignments, computing modifications to the selected contact geometries to provide altered contact geometries in which substantially uniform life theoretically exists along the first contact and also along the second contact; computing the internal bearing misalignments for the altered contact geometries for each segment of the load cycle; computing further modifications to the altered contact geometries to provide further altered contact geometries in which substantially uniform life theoretically exists along the first and second contacts at the recomputed internal misalignments; and reiterating the foregoing steps of computing internal misalignments and computing geometry modifications and altered contact geometries until substantial convergence is achieved.

9. The bearing produced in accordance with the process of claim 8.

10. The process according to claim 8 wherein the contact geometries resulting from the convergence have tapers which are off taper.

* * * * *

UNITED STATES PATENT AND TRADEMARK OFFICE
CERTIFICATE OF CORRECTION

PATENT NO.  : 4,877,340
DATED       : October 31, 1989
INVENTOR(S) : Michael R. Hoeprich It is certified that error appears in the above-identified patent and that said Letters Patent is hereby corrected as shown below:

Column 2, line 28, "3,951,4S3" should read --3,951,483--.

Column 5, line 7, after "under" insert "a".

Column 5, line 11, after "point" delete "occurs".

Signed and Sealed this

Fourth Day of December, 1990

Attest:

HARRY F. MANBECK, JR.

*Attesting Officer*     *Commissioner of Patents and Trademarks*